United States Patent
Chene

(10) Patent No.: US 9,927,540 B2
(45) Date of Patent: *Mar. 27, 2018

(54) METHOD FOR DETERMINING A COLLISION FREE SAIL PATH OF AT LEAST ONE VESSEL OF A FLEET OF VESSELS, CORRESPONDING DEVICE, COMPUTER PROGRAM PRODUCT AND NON-TRANSITORY COMPUTER-READABLE CARRIER MEDIUM

(71) Applicant: SERCEL, Carquefou (FR)

(72) Inventor: Fabien Chene, Guerande (FR)

(73) Assignee: SERCEL, Carquefou (FR)

( * ) Notice: Subject to any disclaimer, the term of this patent is extended or adjusted under 35 U.S.C. 154(b) by 68 days.

This patent is subject to a terminal disclaimer.

(21) Appl. No.: 15/060,082

(22) Filed: Mar. 3, 2016

(65) Prior Publication Data

US 2016/0259077 A1   Sep. 8, 2016

(30) Foreign Application Priority Data

Mar. 4, 2015 (EP) .................................. 15305331

(51) Int. Cl.
*B60L 9/00* (2006.01)
*B60L 11/00* (2006.01)
(Continued)

(52) U.S. Cl.
CPC ............ *G01V 1/3808* (2013.01); *B63B 49/00* (2013.01); *G05D 1/0206* (2013.01); *B63J 2099/008* (2013.01)

(58) Field of Classification Search
CPC .. B63B 49/00; B63J 2099/008; G01V 1/3808; G05D 1/0206

(Continued)

(56) References Cited

U.S. PATENT DOCUMENTS

2003/0112171 A1* 6/2003 Michaelson ............ B63B 43/18
                                                              342/41
2004/0006423 A1* 1/2004 Fujimoto ............. G05D 1/0206
                                                             701/467

(Continued)

FOREIGN PATENT DOCUMENTS

JP       S61204518 A     9/1986
WO    2014198738 A2    12/2014

OTHER PUBLICATIONS

European Search Report and Written Opinion dated Sep. 3, 2015, for European Patent Application No. 15305331.9 filed Mar. 4, 2015.

*Primary Examiner* — Harry Y Oh
(74) *Attorney, Agent, or Firm* — Ipsilon USA, LLP

(57) ABSTRACT

A method is provided for determining a sail path of vessels on a map representative of a marine geographic area, to perform a turn between a start point and an end point, each vessel having a turn radius, the start point, respectively the end point, being associated with a start, respectively an end, circle, the sail path being curvilinear and composed of arcs and straight segments. The method includes: detecting obstacles likely to interfere with at least one vessel; encompassing obstacles into a curvilinear geometric form; determining a sail path of the vessel by minimizing, under constraints, a cost function comprising: a first term representative of the length of arcs making up the sail path and a second term representative of the length of straight segments making up the sail path, taking into account the start and end circles and the curvilinear geometric forms, and a third term of penalization of distance separating the sail path to be determined, at any point of the sail path, and at least one disturbing object.

16 Claims, 5 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *G01V 1/38* (2006.01)
  *G05D 1/02* (2006.01)
  *B63B 49/00* (2006.01)
  *B63J 99/00* (2009.01)

(58) Field of Classification Search
  USPC .......................................................... 701/21
  See application file for complete search history.

(56) References Cited

U.S. PATENT DOCUMENTS

| | | | | |
|---|---|---|---|---|
| 2004/0064249 | A1* | 4/2004 | Lacey | A61H 3/04 |
| | | | | 701/468 |
| 2011/0288714 | A1* | 11/2011 | Flohr | G05D 1/0011 |
| | | | | 701/27 |
| 2012/0130571 | A1* | 5/2012 | Dunkle | G05D 1/0206 |
| | | | | 701/21 |
| 2012/0259489 | A1* | 10/2012 | Hamamatsu | B63H 25/04 |
| | | | | 701/21 |
| 2016/0101838 | A1* | 4/2016 | Kojima | B63B 49/00 |
| | | | | 701/21 |
| 2016/0210863 | A1* | 7/2016 | Kohn-Rich | G05D 1/0646 |
| 2016/0363671 | A1* | 12/2016 | Anderson | G01C 21/203 |
| 2017/0001699 | A1* | 1/2017 | Macikunas | G08G 3/00 |

* cited by examiner

METHOD FOR DETERMINING A COLLISION FREE SAIL PATH OF AT LEAST ONE VESSEL OF A FLEET OF VESSELS, CORRESPONDING DEVICE, COMPUTER PROGRAM PRODUCT AND NON-TRANSITORY COMPUTER-READABLE CARRIER MEDIUM

1. CROSS-REFERENCE TO RELATED APPLICATIONS

This application claims priority from European patent Application No. EP 15305331.9, filed Mar. 4, 2015, the content of which is incorporated herein by reference in its entirety.

2. FIELD OF THE INVENTION

The field of the invention is that of marine navigation.

More specifically, the invention relates to planning a marine seismic survey involving one vessel or a fleet of vessels.

In particular, the invention relates to a method and a device for determining a sail path of at least one vessel to perform an optimized turn between two points of a survey area.

The invention can be applied notably to the geophysical prospecting industry using seismic method, but may also be applied to any field using a vessel navigation planner in a marine environment.

3. TECHNOLOGICAL BACKGROUND

It is sought more particularly here below in this document to describe problems existing in the field of marine navigation for seismic prospection. The invention of course is not limited to this particular field of application but is of interest for any sail path determining method and device that has to cope with closely related or similar issues and problems.

A marine seismic acquisition in a survey area conventionally use networks of sensors distributed along cables in order to form linear acoustic antennas, also referred to as "streamers" or "seismic streamers". The seismic streamers are towed through water behind a vessel or a fleet of vessels at a variable water depth.

A seismic method is usually based on analysis of reflected seismic waves. Thus, to collect geophysical data in the marine environment, one or more submerged seismic sources (e.g. air guns) are activated in order to propagate seismic wave trains. The pressure wave generated by the seismic source passes through the column of water and propagates through the different layers of the sea bed, part of the acoustic waves reflecting on the layers interfaces. Reflected signals are then detected by the seismic sensors distributed over the length of the seismic streamers, digitized and transmitted to a central unit onboard the vessel, where they are stored and processed.

A key driver of a marine seismic survey sits in the minimization of the survey operational expenditures, which partially rely on the time spent surveying. Consequently, time saving is of prime importance in a marine seismic survey.

In operation, as shown in FIG. 1, the survey is discretized into sail paths 12, 13, 14 . . . , 17 along which the vessel 10 must sail. A sail line is an arbitrary geometric curve, which can be a straight line, a curve line, or a combination of both for example. Each theoretical location where a seismic source must shoot, is a shot point location (also referred to as "shot point") SP defined by its geographical coordinates. When the seismic source reaches this shot point, it is activated to produce an acoustic wave. The shot points SP of seismic sources are arranged along the sail paths, also called "preplot" lines.

The acquisition process is controlled and monitored by a navigation system (also referred to as INS, for "Integrated Navigation System"), which is onboard each vessel and whose role is to compute position of sources and sensors if any, to drive the vessels along their sail path according to the predefined preplot geometry, and to activate sources to perform seismic acquisition at desired location. In case a fleet of vessels forms a cluster operating the seismic survey, also referred to as a multi-vessel operation, one vessel is set as a master of the cluster. So does its navigation system. A multi-vessel operation requires the vessels to match a predetermined geometry, relatively to their master, when the fleet is surveying a preplot line. This induces severe timing constraints on the position of each vessel relatively to the master, as they will start shooting a preplot line. The vessel pattern must be properly set-up when arriving to the start of preplot line.

To carry out a global coverage of the survey area, each vessel involved in the survey needs to turn from a preplot line to another preplot of the survey area. For example, vessel 10 will turn from a point A, also called end of line (EOL) point, which constitutes the end of the preplot line 12, to a point B, also called start of line (SOL) point, which constitutes the start of the preplot line 17. Each vessel has its own turn radius. This physical constraint is notably due to the length of towed streamers 18, which can be up to several kilometers long.

In the following description, an arc of circle designates an unbroken portion of the circumference of a circle or any other curved line.

The sail path 20 the vessel 10 shall use to perform its turn can be composed of an arc of a start circle $C_A$ passing through the EOL point A with a radius greater than or equal to the vessel's turn radius, an arc of an end circle $C_B$ passing through the SOL point B with a radius greater than or equal to the vessel's turn radius, and a straight segment linking the arcs of the start and end circles.

A problem arises when an obstacle 11 is located on the sail path that the vessel 10 shall initially use to perform its turn (such as oil platform, rig, wells, FPSO ("Floating Production Storage Offloading") unit, etc.). In that case, a new sail path shall be determined so as to get around this obstacle or those obstacles during the vessel's turn.

This operation of determination of a new sail path (which avoids the obstacles) is manually done by a human operator onboard the vessel, by using the information given by a navigation software. The operator typically watches a navigation screen on which is edited the sail path that the vessel shall use during the turn from the start point A to the end point B, to verify that no collision with obstacles will occur. If an obstacle is detected as being likely to interfere with the vessel on the sail path originally defined by the software, the operator has at his disposal a graphical tool that allows to graphically add an extra turn, wherever he desires, based on a circle for each detected obstacle to get around them. The extra circle or circles graphically added are then taken into account by the software to compute a new sail path from the start point A to the end point B so as to adjust the vessel course accordingly. The software determines the vessel's sail path using combinations of some basic trigonometric calculations taking into account tangential points. In practice, the sail path is constantly adjusted visually by the operator.

However, this well-known solution involves a human operator at each stage of the process, which is not optimal. Indeed, the graphic adjustment of the sail path by the operator is inherently rough, thereby resulting in suboptimal sail path computation and operational expenditures. In addition, the responsibility of the safety with regards to obstacle avoidance is totally deported to the operator.

In multi-vessel survey, this problem is made more complex since the operator has to determine an optimal sail path for each of the vessels involved in the survey, while ensuring that the vessels do not collide one with another or with fixed or moving obstacles.

Another difficulty for the operator is to obtain a perfect synchronization of all vessels, possibly moving at different speeds, so that they end their turn at the same time.

Doing so manually by taking all these constraints into account is very difficult to achieve even for an experienced user. This is all the more true since the number of vessels to control and the number of obstacles present in the navigation area is important.

4. SUMMARY OF THE INVENTION

A particular embodiment of the invention proposes a method for determining a sail path of a fleet comprising at least one vessel ($V_i$) on a map representative of a marine geographic area, to perform a turn between a start point ($A_1$) and an end point ($B_1$), each vessel having a turn radius, which turn radius defines the smallest circle the vessel is able to sail, the start point, respectively the end point, being associated with a start, respectively end, curvilinear geometric form to which it belongs, said curvilinear geometric form consisting in a combination of at least a circle and/or an ellipse which each has a predefined radius of curvature larger than or equal to said turn radius, the sail path being curvilinear and composed of arc segments and straight segments and comprising at least one segment of arc of the start curvilinear geometric form and at least one segment of arc of the end curvilinear geometric form. The method is such that it comprises steps of:

detecting, in the map, at least one obstacle likely to interfere with said at least one vessel;
and for a given vessel:
encompassing said at least one detected obstacle into an intermediate curvilinear geometric form consisting in a circle or ellipse or of a combination of circle(s) and/or ellipse(s) each having a radius of curvature, at every point of the circumference of said intermediate curvilinear geometric form, that is greater than or equal to said radius of curvature of said given vessel,
determining a sail path of said given vessel by minimizing, under a set of predefined constraints, an individual cost function comprising:
a first term representative of the length of arc segments making up the sail path to be determined, taking into account the start and end curvilinear geometric forms and the intermediate curvilinear geometric form into which is encompassed said at least one detected obstacle,
a second term representative of the length of straight segments making up the sail path to be determined, taking into account the start and end curvilinear geometric form into which is encompassed said at least one detected obstacle,
a third term of penalization of a distance separating the sail path to be determined, at any point of said sail path, and at least one disturbing object, when said distance decreases.

Thus, the invention relies on an automatic method for determining a sail path without collision for at least one vessel to perform a turn, which does not require any human operator. The general principal of the invention consists in associating obstacles detected each with a curvilinear geometric form consisted of an circle or ellipse or of a combination of circle(s) and/or ellipse(s) and in determining an optimal sail path by minimizing a cost function under constraints taking into account the detected obstacles as constraints, on the basis of the curvilinear geometric form with which it is associated.

The third term is a penalization term which acts in the cost function to be minimalized so as to create virtual cost which increases when the distance between the sail path to be determined and the involved disturbing object decreases, and which decreases when said distance increases. For example, the disturbing object can be one of the obstacles detected in detecting step and/or one of the vessels of the fleet other than said given vessel.

Note that the term "encompassing" has to be understood as enclosing the detected obstacle in at least one curvilinear form, for example said form being a geometrical circumscribed circle.

In another particular embodiment, the invention proposes a method for determining a sail path of a fleet comprising at least two vessels on a map representative of a marine geographic area, to perform a turn between a start point and an end point, each vessel having a turn radius, which turn radius defines the smallest circle the vessel is able to sail, the start point, respectively the end point, being associated with a start, respectively end, curvilinear geometric form to which it belongs, said curvilinear geometric form consisting of a combination of at least a circle and/or an ellipse which each has a predefined radius of curvature larger than or equal to said turn radius, the sail path being curvilinear and composed of arc segments and straight segments and comprising at least one segment of arc of the start curvilinear geometric form and at least one segment of arc of the end curvilinear geometric form. The method is such that it comprises steps of:

detecting, in the map, at least one obstacle likely to interfere with said fleet of vessels;
and for said fleet of vessels:
encompassing, for each vessels, said at least one detected obstacle into a curvilinear geometric form consisting of an intermediate circle or ellipse or of a combination of intermediate circle(s) and/or ellipse(s) each having a radius of curvature, at every point of the circumference of said intermediate curvilinear geometric form, that is greater than or equal to said turn radius of each vessel,
determining the sail paths of the fleet vessels by minimizing, under a set of predefined constraints, a sum of individual cost functions, each individual cost function being associated with a distinct vessel of the fleet, and comprising:
a first term representative of the length of arc segments making up the sail path to be determined, taking into account the start and end curvilinear geometric forms and the intermediate curvilinear geometric form into which is encompassed said at least one detected obstacle, a second term representative of the length of straight segments making up the sail path to be determined, taking into account the start and end curvilinear geometric forms and the intermediate curvilinear geometric form into which is encompassed said at least one detected obstacle.

a third term of penalization of a distance separating the sail path to be determined, at any point of said sail path, and at least one disturbing object, when said distance decreases.

This particular embodiment of the invention is well adapted to multi-vessel operations involving a fleet of vessels sharing a same survey area and pertaining to the same survey operation. This is particularly advantageous since it enables to directly and automatically provide an optimal sail path for each vessel implied in the multi-vessel operation avoiding obstacles.

The Applicant discovered that it is possible to determine sail paths for a fleet of vessels making a turn, by implementing a process of constrained optimization consisting in minimizing a sum of cost functions, each of which being associated with a vessel of the fleet.

The third term is a penalization term which acts in the cost function to be minimalized so as to create virtual cost which increases when the distance between the sail path to be determined and the involved disturbing object decreases, and which decreases when said distance increases. For example, the disturbing object can be one of the obstacles detected in detecting step and/or one of the vessels of the fleet other than said given vessel.

Advantageously, each individual cost function further comprises a fourth term representative of speeds of said at least two vessels.

Thus, the invention offers the possibility of imposing an additional constraint into the cost function relative to the speeds of vessels in a multi-vessel context.

For example, a constraint to take into consideration in the minimization of the cost function may be for instance to penalize the high speeds. Indeed, for reasons of operation cost, a purpose of an offshore oil exploration over a multi-vessel survey is to cover its underlying area as quickly as possible. In that case, it may be assumed that each vessel of the fleet of vessels shall turn as short as possible with a low speed. The invention thus offers the possibility of imposing that the resulting speeds of vessels to be the slowest possible. This ensures a cost-efficiency marine survey.

According to a particular feature, said at least one disturbing object is an obstacle detected in said detecting step, said detected obstacle being either fixed or moving.

The method takes into account in the cost function to be minimized the obstacles detected in the detecting step, so as to provide a collision free sail path avoiding obstacles.

According to a particular feature, said at least one disturbing object is a vessel of said fleet other than the vessel associated with said individual cost function.

Thus, in a multi-vessel context, the method takes into account for a given vessel in the cost function to be minimized, the vessels of the fleet other than said given vessel for which the sail path is determined, so as to provide a collision free sail path avoiding the other vessels.

Thus the invention provides a sail path determining method that allows avoid any collisions with another vessel of the fleet of vessels and/or with obstacles present in the marine survey area, which may be either fixed or moving.

According to a particular feature, said set of predefined constraints belongs to the group comprising:

as geometrical constraints:
a constraint relative to the tangency of straight segments making up the sail path to be determined;
a constraint relative to the azimuth at the start and end points;
a constraint relative to the positioning of tangential points on the start and end curvilinear geometric forms and the intermediate curvilinear geometric form;
a constraint relative to the radius of curvature of the start and end curvilinear geometric forms and the intermediate curvilinear geometric form;

as operational constraints:
a constraint relative to the vessel speed;
a constraint relative to the vessel synchronization.

Thus, the each cost function is subject to a set of predefined constraints that are required to be satisfied to determine an optimal sail path for each of vessel of the fleet. This list is not exhaustive and the person skilled will be able to impose further constraints considered to be relevant or appropriate without departing from the scope of the invention.

According to a particular feature, the start and end curvilinear geometric forms and the intermediate curvilinear geometric form are consisted each of a circle.

This simple geometric form simplifies calculations.

According to a particular feature, the method comprises the following steps:
(a) selecting a given number of obstacle(s) each associated with an intermediate curvilinear geometrical form;
(b) carrying out said determining step taking into account said given number of obstacle(s);
(c) checking that no determined sail path passes through a curvilinear geometric form;

and, in event of negative checking, a new iteration of said steps (a), (b), (c) with a different given numbers of obstacle(s) is carried out.

Thus, the method allows ensuring that the results from the determining step converge on a consistency solution. If not, a new iteration is carried out to take into account a new set of obstacles in the process of constraint minimizing cost function.

According to an alternative embodiment, the method comprises:
(a) selecting a number q of obstacle(s) each associated with an intermediate curvilinear geometrical form;
(b) carrying out said determining step with said number q of obstacle(s);

and at least two iterations of said steps (a) and (b) is carried out with different numbers q of obstacle(s) so as to deliver a set of at least two respective potential sail paths, and said method comprises a step of selecting, among said set of potential sail paths, a sail path as a function of a predetermined operational criteria.

In that alternative embodiment, performing several iterations of the determining step with a different number of obstacles, enables to take into account a plurality of potential sail paths avoiding obstacles, and finally to have the advantage of choosing only the path among the set of potential sail paths that meets a predetermined operational criteria.

The operational criteria can be a distance criteria such that the selected path is the path that has the shortest path length.

The operational criteria can be a temporal criteria such that the selected path is the path for which the sail duration is the shortest.

According to a particular feature, the first and second terms takes into account a number of intermediate curvilinear geometrical forms lower or equal to a predetermined maximal number.

This enables to set a limit threshold of curvilinear geometrical forms to take into consideration in the sail path determination step, in order to limit computing time (for example in case the number of obstacles detected is high).

According to a particular feature, the method comprises a step of setting, in said map, a sail turning area of at least one vessel, having a predetermined geometric form and in which are located said start and end points, and wherein said detecting step is carried out as a function of the sail turning area.

The sail turning area allows not to care non-disruptive obstacles and concentrating on a reduced number of obstacles likely to interfere with the at least one vessel.

According to a particular feature, the predetermined geometric form of the sail turning area has a centre the barycentre of the start and end points of said at least one vessel.

This ensures to encompass all start and end points of the at least one vessel.

Note that "barycenter" has to be understood as the geometric center or centroid of the start and end points of vessels. The barycentre coordinates correspond to the center of gravity of the predetermined geometric form.

According to a particular feature, the predetermined geometric form of the sail turning area is an ellipse.

Because of its lengthened shape, the elliptical shape is particularly well adapted to encompass all the start and end points of the vessels when turning.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention pertains to a device for determining a sail path of at least one vessel on a map representative of a marine geographic area, to perform a turn between a start point and an end point, each vessel having a turn radius, which turn radius defines the smallest circle the vessel is able to sail, the start point, respectively the end point, being associated with a start, respectively end, curvilinear geometric form to which it belongs, said curvilinear geometric form consisting of a combination of at least a circle and/or an ellipse which each has a predefined radius of curvature larger than or equal to said turn radius, the sail path being curvilinear and composed of arc segments and straight segments and comprising at least one segment of arc of the start curvilinear geometric form and at least one segment of arc of the end curvilinear geometric form. The device is such that it comprises:

means for detecting, in the map, at least one obstacle likely to interfere with said at least one vessel;
and for a given vessel:
means for encompassing said at least one detected obstacle into an intermediate curvilinear geometric form consisting of a circle or ellipse or of a combination of circle(s) and/or ellipse(s) each having a radius of curvature, at every point of the circumference of said intermediate curvilinear geometric form, that is greater or equal to said turn radius of said given vessel,
means for determining a sail path of said at least one vessel by minimizing, under a set of predefined constraints, an individual cost function comprising:
a first term representative of the length of arc segments making up the sail path to be determined, taking into account the start and end curvilinear geometric forms and the intermediate curvilinear geometric form into which is encompassed said at least one detected obstacle,
a second term representative of the length of straight segments making up the sail path to be determined, taking into account the start and end curvilinear geometric forms and the intermediate curvilinear geometric form into which is encompassed said at least one detected obstacle,
a third term of penalization of a distance separating the sail path to be determined, at any point of said sail path, and at least one disturbing object, when said distance decreases.

In another embodiment, the invention pertains to a device for determining a sail path of a fleet comprising at least two vessels on a map representative of a marine geographic area, to perform a turn between a start point and an end point, each vessel having a turn radius, which turn radius defines the smallest circle the vessel is able to sail, the start point, respectively the end point, being associated with a start, respectively end, curvilinear geometric form to which it belongs, said curvilinear geometric form consisting of a combination of at least a circle and/or an ellipse which each has a predefined radius of curvature larger than or equal to said turn radius, the sail path being curvilinear and composed of arc segments and straight segments and comprising at least one segment of arc of the start curvilinear geometric form and at least one segment of arc of the end curvilinear geometric form. The device is such that it comprises:

means for detecting, in the map, at least one obstacle likely to interfere with said fleet of vessels,
and for said fleet of vessels:
means for encompassing, for each vessels, said at least one detected obstacle into a curvilinear geometric form consisting of an intermediate circle or ellipse or of a combination of intermediate circle(s) and/or ellipse(s) each having a radius of curvature, at every point of the circumference of said intermediate curvilinear geometric form, that is greater or equal to said turn radius of each vessel,
means for determining the sail paths of the fleet vessels by minimizing, under a set of predefined constraints, a sum of individual cost functions, each individual cost function being associated with a distinct vessel of the fleet, and comprising:
a first term representative of the length of arc segments making up the sail path to be determined, taking into account the start and end curvilinear geometric forms and the intermediate curvilinear geometric form into which is encompassed said at least one detected obstacle,
a second term representative of the length of straight segments making up the sail path to be determined, taking into account the start and end curvilinear geometric forms and the intermediate curvilinear geometric form into which is encompassed said at least one detected obstacle a third term of penalization of a distance separating the sail path to be determined, at any point of said sail path, and at least one disturbing object, when said distance decreases.

5. LIST OF FIGURES

Other features and advantages of embodiments of the invention shall appear from the following description, given by way of an indicative and non-exhaustive examples and from the appended drawings, of which:

FIG. 1, already described with reference to the prior art, presents a schematic illustration of a classic method of determination of a sail path of a seismic vessel to perform a turn;

6. DETAILED DESCRIPTION

In all of the figures of the present document, identical elements and steps are designated by the same numerical reference sign.

In the description here below, the word "barycenter" has to be understood as the geometric center or centroid of the start and end points of vessels. The barycentre coordinates correspond to the center of gravity of the predetermined geometric form.

Also, in the description here below, the term "encompassing" has to be understood as enclosing the detected obstacle in at least one curvilinear form, for example said form being a geometrical circumscribed circle.

In the example described below, we consider the determination of a collision free sail path of a seismic vessel in a turn in the context of a sea oil survey.

Figure 2:
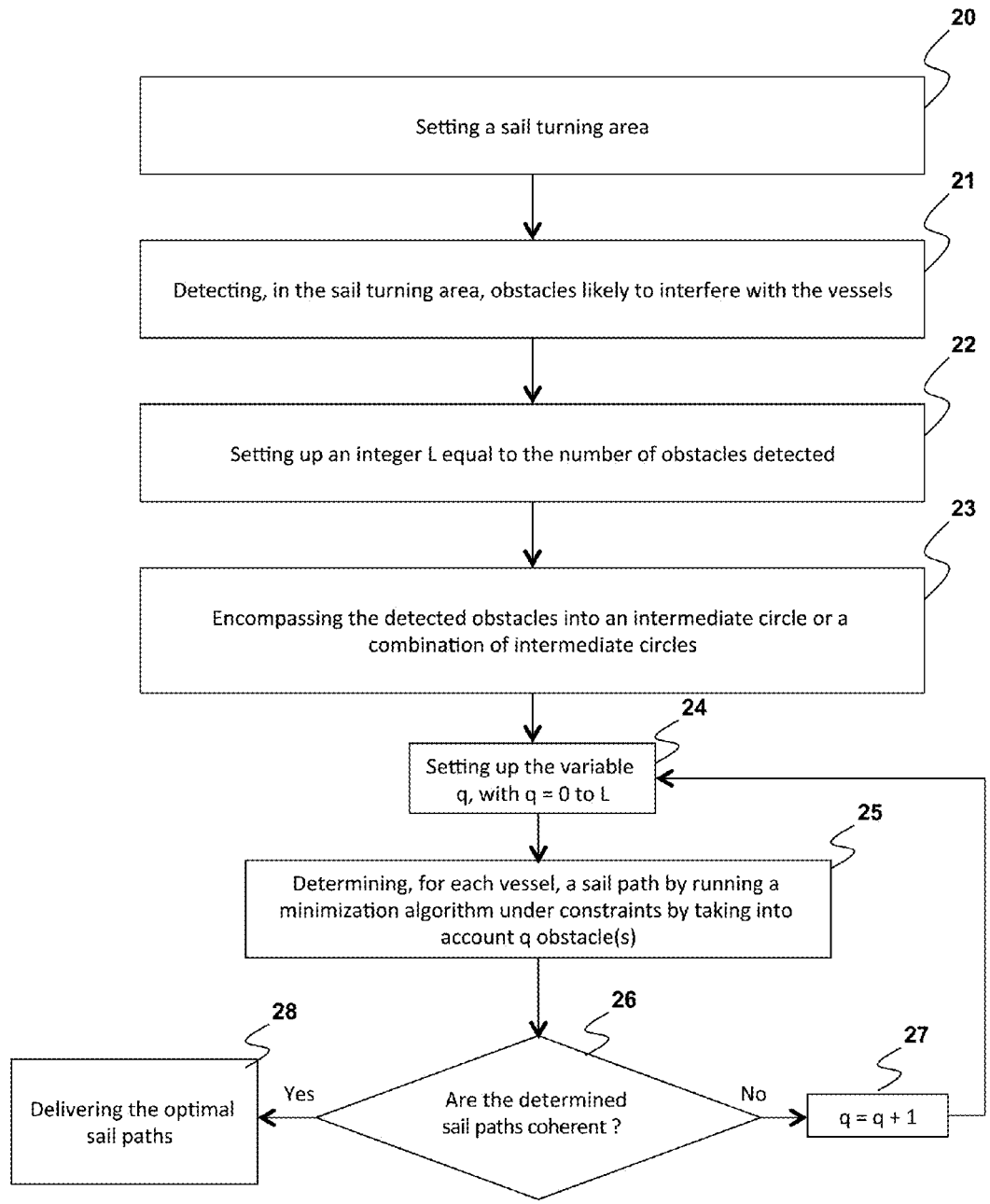
FIG. 2 is a flowchart of a particular embodiment of the method according to the invention.

Referring now to FIG. 2, we present a particular embodiment of the proposed sail path determining method. The method is carried out by a device (the principle of which is described in more details below in relation with FIG. 5).

As illustrated in FIGS. 3 and 4a, 4b, 4c, we consider two vessels $V_1$ and $V_2$ in a seismic system comprising a fleet of vessels sharing a same survey area and pertaining to the same survey operation (also called "multi-vessel operation"). The number of vessels illustrated here is deliberately limited purely for the purpose of the pedagogical description, and so as not to burden the description. Of course a greater number of vessels can be involved in the oil survey without departing from the scope of the invention.

The method is based on the determination of a sail path of vessels to perform a turn between a start point and an end point, in presence of obstacles. The method is carried out in a map which represents a marine geographical area in which the vessels sail. This map may be displayed (or not) to the operator via a human/machine interface.

The vessel $V_1$ is intended to perform a turn between the start point $A_1$ and the end point $B_1$. The start point $A_1$ (or SOL) point) is associated with a start circle having a predefined radius of curvature $r_1$ (for example 3 km), the start point $A_1$ belonging to the start circle (we talk about "tangential point"). The end point (or EOL point) $B_1$ is associated with an end circle having the radius of curvature $r_1$, the end point $B_1$ belonging to the end circle. The points $A_1$ and $B_1$ correspond to the tangent points between the vessel sail path and the preplot line.

The vessel $V_2$ is intended to perform a turn between the start point $A_2$ and the end point $B_2$. The start point $A_2$ is associated with a start circle having a predefined radius of curvature $r_2$ (for example 2 km), the start point $A_2$ belonging to the start circle. The end point $B_2$ is associated with an end circle having the radius of curvature $r_2$, the end point $B_2$ belonging to the end circle.

In the present example, $r_1$ is equal to the minimum radius of curvature that the vessel $V_1$ is capable to make ($r_{1min}$) (also called "turn radius") and $r_2$ is equal to the minimum radius of curvature that the vessel $V_2$ is capable to make ($r_{2min}$) (also called "turn radius"). Indeed, for reasons of optimization of operation cost, it is assumed thereafter that each vessel of the fleet of vessels shall turn as short as possible. Especially, this allows reducing vessel fuel and save time to perform oil survey. Of course, the radius of curvature $r_1$ can be chosen as being greater than $r_{1min}$ ($r_1 > r_{1min}$) and the radius of curvature $r_2$ can be chosen as being greater than $r_{2min}$ ($r_2 > r_{2min}$).

It is assumed that the sail path to be determined for a given vessel, is curvilinear and composed of arc segments and straight segments, and comprised at least one segment of arc of the start circle and at least one segment of arc of the end circle.

In step 20, the device sets, in the map, a sail turning area 30 of the two vessels having a form of ellipse and in which are located the start points ($A_1$, $A_2$) and end points ($B_1$, $B_2$) of the vessels $V_1$ and $V_2$. The centre of the sail turning area 30 is the barycentre of the start and end points of the two vessels $V_1$ and $V_2$. The elliptical shape of the sail turning area 30 is particularly well adapted (because of its lengthened shape) to encompass all the start and end points of the fleet of vessels.

It should be noted that step 20 is optional. Such a sail turning area can be designed as such it gathers the whole available map for example.

Of course, the determining method can be implemented with other predetermined geometric forms more or less complex without departing from the scope of the invention.

Figure 3:
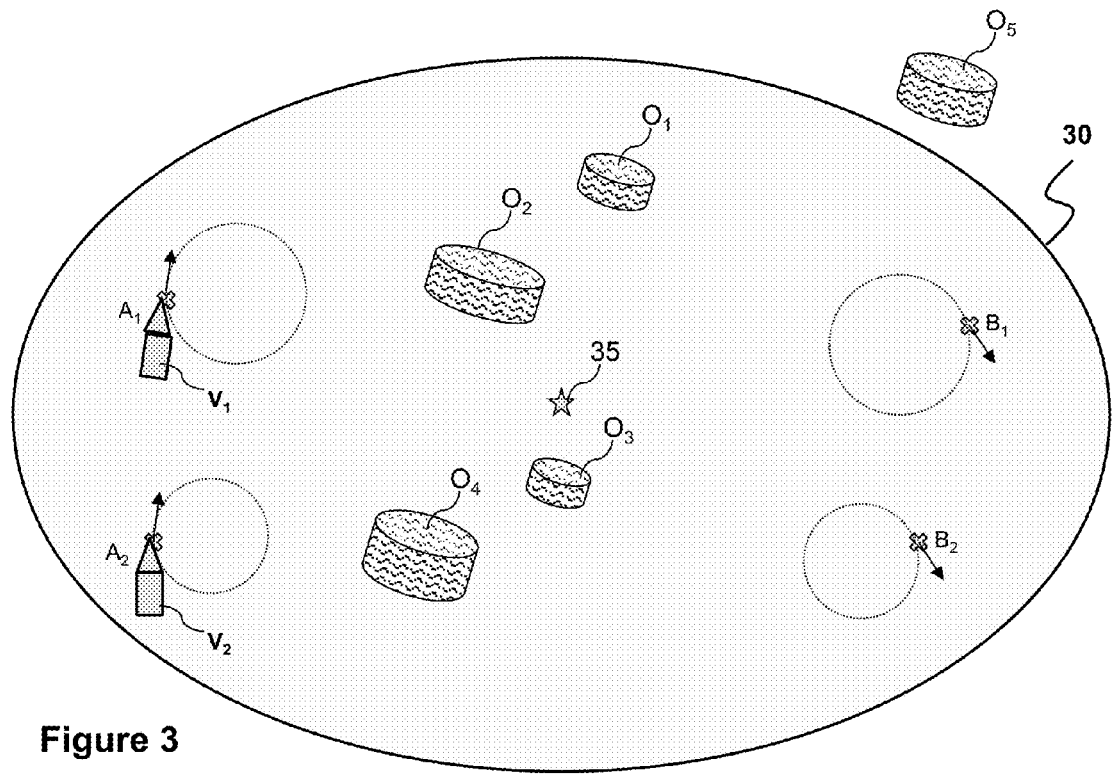
FIG. 3 is a schematic illustration of the principle of setting a sail turning area for a fleet of seismic vessels according to the embodiment illustrated in FIG. 2.

In step 21, the device detects, in the sail turning area 30, obstacles likely to interfere with the vessels $V_1$ and $V_2$. The obstacles in FIG. 3 are referred as $O_1$, $O_2$, $O_3$, $O_4$, $O_5$. The obstacle $O_5$ being not comprised in sail turning area 30, it is considered not interfering with the vessels. Thus, only the obstacles $O_1$, $O_2$, $O_3$, $O_4$ are detected by the device and taking into account in the ongoing method.

The sail turning area 30 enables the device to filter non-disruptive obstacles and to concentrate on a reduced number of obstacles likely to interfere with the vessels $V_1$ and $V_2$.

In step 22, the device sets up an integer L equal to the total number of obstacles detected in step 21. In the present example, L is equal to 4 ($O_1$ to $O_4$).

In step 23, for each vessel $V_1$ and $V_2$ (which has its own turn radius), the device encompasses each obstacle detected in the sail turning area 30 into a circle whose radius of curvature is greater than or equal to the considered vessel's turning radius. For vessel $V_1$, each obstacle detected is encompassed into a circle having radius of curvature that is greater than or equal to $r_1$. For vessel $V_2$, each obstacle detected is encompassed into a circle having radius of curvature that is greater or equal to $r_2$.

Other geometric forms encompassing each obstacle can be implemented without departing from the scope of the invention. More generally, each detected obstacle can be encompassed into a curvilinear geometric form consisting of an intermediate circle or ellipse or of a combination of intermediate circle(s) and/or ellipse(s). A constraint however is that each intermediate circle or ellipse must have a radius of curvature, at every point of the circumference of the curvilinear geometrical form, greater than or equal to the predefined radius of curvature of the considered vessel. The number of intermediate circle(s) and/or ellipse(s) depends on the level of precision that is desired to encompass each obstacle. The person skilled in the art can use any known meshing method or spatial discretization method within its range, in order to adapt the curvilinear geometric form as close as can be to the real shape of obstacles.

Figure 4A:
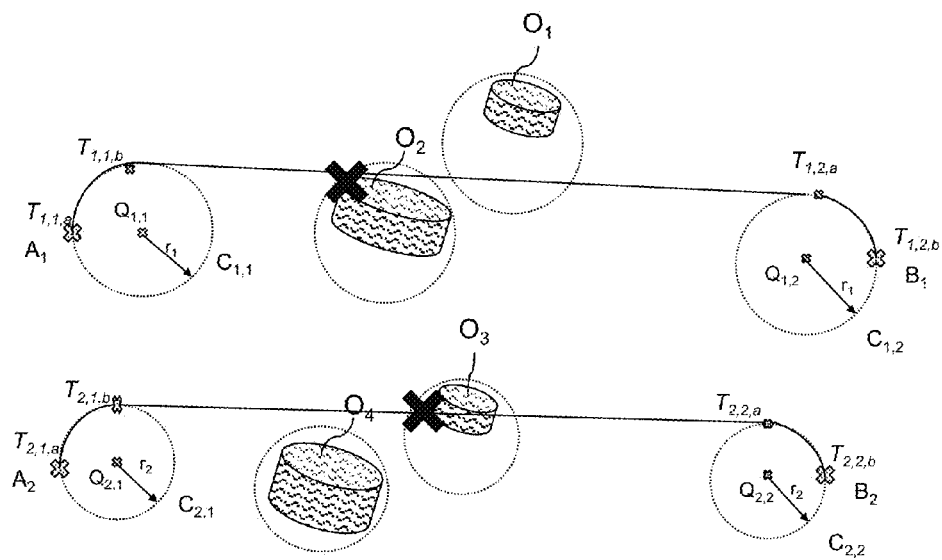
FIGS. 4a, 4b, 4c are schematic illustrations of the principle of functioning of the method according to the embodiment illustrated in FIG. 2.
Figure 4B:
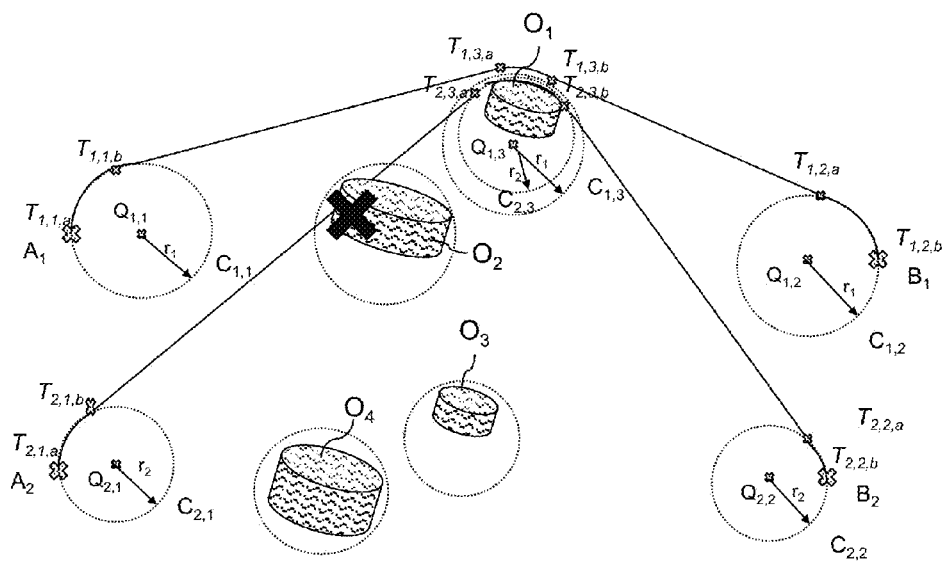
Figure 4C:
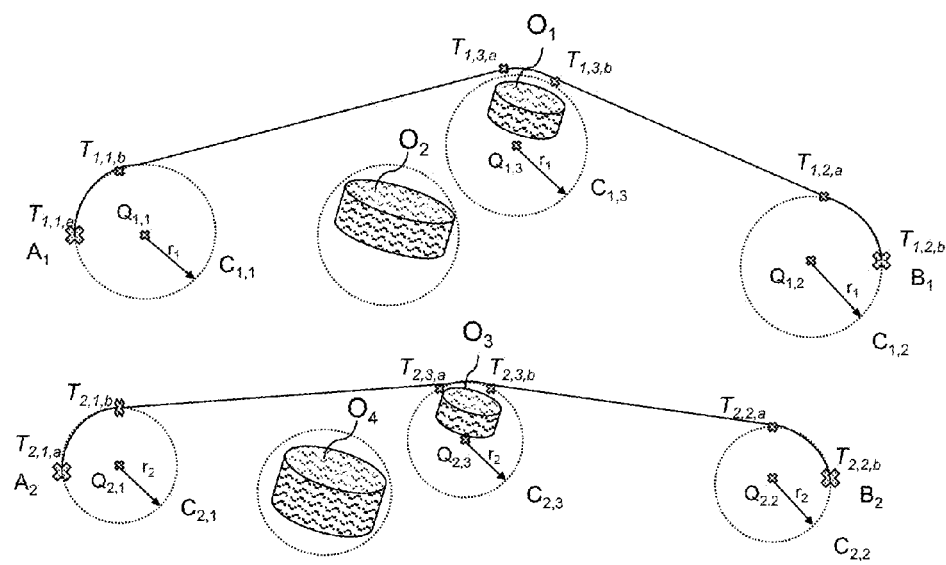

In the exemplary embodiment illustrated in FIGS. 4a-4c, the curvilinear geometric form is a circle. This simple geometric form simplifies calculations. For example, for vessel $V_1$, the circle radius of curvature is chosen equal to $r_1$ if the obstacle size allows it, and greater than $r_1$ if not. Thus, the device encompasses the obstacle $O_1$ into a first intermediate circle, the obstacle $O_2$ into a second intermediate circle, the obstacle $O_3$ into a third intermediate circle and the obstacle $O_4$ into a fourth intermediate circle.

In step 24, the device sets up a variable q (with q=0 to L) corresponding to the number of obstacle(s) to be taken into account the subsequent steps of the method. The variable q is first set to zero (q=0). Each obstacle taken into account in the method is associated with an intermediate circle and assumed as constraint in the turning sail path computation.

In step 25, the device shall run a constrained minimization algorithm in order to compute, for each vessel of the fleet, an optimal sail path to perform a turn. The principle is to minimize a cost function subject to a set of predefined constraints.

We consider that the cost function is of the type usually used in Newton's minimization method based on Lagrange parameters. In a particular embodiment, the global cost function, F(X), is defined as follows:

$$F(X) = \sum_{i=1}^{M} \frac{f_i(X)}{v_i}$$

with:
X, the unknown vector comprising:
- the coordinates (x, y) of the centre $Q_{i,j}$ of the circle $C_{i,j}$, $C_{i,j}$ being the circle of index j that belongs to the vessel i;
- the coordinates (x, y) of the tangential points of the circle $C_{i,j}$, $T_{i,j,a}$ being the first tangential point belonging to the circle $C_{i,j}$ and $T_{i,j,b}$ is the second tangential point belonging to the circle $C_{i,j}$;

M, the number of vessels involved in the computation (M=2 in the present example);
$f_i(X)$, the individual cost function associated with the vessel $V_i$, defined as follows:

$$f_i(X) = \sum_{k=1}^{min(N_i,q)+2} arclen_k(X) + \sum_{k=1}^{min(N_i-1,q-1)+2} seglen_k(X) + \sum_{k=1}^{M} \sum_{p=k+1}^{M} h_{kp}(X) + \sum_{k=1}^{M} \sum_{p=1}^{L} z_{kp}(X)$$

with:
$N_i$, the number of circles $C_{i,j}$ in which the obstacles are encompassed for the vessel $V_i$ (assuming that, in the example, one obstacle is associated with one circle);

q, the number of obstacles considered in the iterative resolution, $0 \leq q \leq L$;
$arclen_k$, a function that computes the length of an arc of circle comprised between $T_{i,j,a}$ and $T_{i,j,b}$ for the circle $C_{i,j}$;
$seglen_k$, a function that computes the length of an arc of circle comprised between $T_{i,j,b}$ and $T_{i,j+1,a}$ for the circle $C_i$;
L, the total number of detected obstacles;

$$h_{kp}(X) = \int_{t_{start}(X)}^{t_{end}(X)} gor_{kp}(t)dt.$$

$r_{kp}$ is the distance between the vessel k and a vessel p at a moment t. g is a function which enables to create a virtual cost in the cost function such that the cost is increased when the distance $r_{kp}$ decreases and, inversely, the cost is decreased when the distance $r_{kp}$ increases. For instance, the function g may be defined such as g=1/x. Of course, other mathematical functions in respect of this principle can be envisaged without departing from the scope of the invention, such as $g=1/x^2$, $g=1/(1+x)$, $g=1/(1+x^2)$ for example. In the function $h_{kp}$, $t_{start}$ represents the moment at which the sail path starts and $t_{end}$ represents the moment at which the sail path ends.

$$z_{kp}(X) = \int_{t_{start}(X)}^{t_{end}(X)} xot_{kp}(t)dt.$$

$t_{kp}$ is the distance between the vessel k and an obstacle p at a moment t. g is a function which enables to create a virtual cost in the cost function such that the cost is increased when the distance $t_{kp}$ decreases and, inversely, the cost is decreased when the distance $t_{kp}$ increases. For instance, the function g may be defined such as g=1/x. Of course, other mathematical functions in respect of this principle can be envisaged without departing from the scope of the invention, such as $g=1/x^2$, $g=1/(1+x)$, $g=1/(1+x^2)$ for example. In the function $z_{kp}$, $t_{start}$ represents the moment at which the sail path starts and $t_{end}$ represents the moment at which the sail path ends.

The first term $\Sigma_{k=1}^{min(N_i,q)+2} arclen_k(X)$ is representative of the length of arc of circle making up the sail path to be determined, taking into account the start and end circles and the intermediate circle(s) into which are encompassed the detected obstacles.

The second term $\Sigma_{k=1}^{min(N_i-1,q-1)+2} seglen_k(X)$ is representative of the length of straight segments making up the sail path to be determined, taking into account the start and end circles and the intermediate circle(s) into which are encompassed the detected obstacles.

The third term $\Sigma_{k=1}^{M} \Sigma_{p=k+1}^{M} h_{kp}(X) + \Sigma_{k=1}^{M} \Sigma_{p=1}^{L} z_{kp}(X)$ is a term which penalizes the cost function to be minimalized when the sail path to be determined comes closer to the disturbing object (vessel or obstacle). It comprises:
- the term $\Sigma_{k=1}^{M} \Sigma_{p=k+1}^{M} h_{kp}(X)$ which penalizes the distance between the sail path to be determined, at any point of said sail path, and the involved vessel p;
- the term $\Sigma_{k=1}^{M} \Sigma_{p=1}^{L} z_{kp}(X)$ which penalizes the distance between the sail path to be determined, at any point of said sail path, and the involved obstacle p (which may be fixed or moving).

This third term aims at generating a collision free solution for each vessel.

The purpose is to minimize the time spent by the fleet of vessels to perform a turn, at the slowest possible speed, so that they end it at the same time while avoiding any collisions with the obstacles detected in the sail turning area 30.

Thus, to determine a sail path for each of the vessels $V_1$ and $V_2$, the device carried out a constraint minimization of the global cost function F(X) such as:

$$\nabla F(X) = \nabla \left( \sum_{i=1}^{M} \frac{f_i(X)}{v_i} \right) = 0$$

The minimization algorithm is performed under the following constraints:
geometrical constraints, such as:
a constraint relative to the tangency of straight segments making up the sail path to be determined (the transition from a circle arc and a straight segment, and vice versa, must be smooth (i.e. mathematically derivable at the transition point));
a constraint relative to the azimuth at the start and end points;
a constraint relative to the positioning of tangential points on the start and end circles and the curvilinear geometric form (the tangential points must be located on their circle circumference and the first tangential point must be reached before the second one);
a constraint relative to the radius of curvature of the start and end circles and the curvilinear geometric form;
as operational constraints:
a constraint relative to the vessel speed (vessels have to respect their speeds constraints which can be a fixed speed, a maximum speed or a speed comprised in a predetermined range of values);
a constraint relative to the vessel synchronization (the duration elapsed to make a turn for each of the vessels must be identical).

To illustrate, let's consider the example of FIGS. 4a-4c.
For q=0 (no obstacle is taken into account)
This is illustrated by FIG. 4a.
M=2 (number of vessels involved in the constrained minimization algorithm)
$N_1$=1 (number of circle encompassing an obstacle for the vessel $V_1$)
$N_2$=1 (number of circle encompassing an obstacle for the vessel $V_2$)
L=4 (total number of obstacles detected in step 21)
$v_1$: speed of the vessel $V_1$
$v_2$: speed of the vessel $V_2$
Based on the equation (1):

$$F(X) = \sum_{i=1}^{2} \frac{f_i(X)}{v_i} = \frac{f_1(X)}{v_1} + \frac{f_2(X)}{v_2}$$

Based on the equation (2):

$$f_1(X) = \sum_{k=1}^{2} arclen_k(X) + \sum_{k=1}^{1} seglen_k(X) + \sum_{k=1}^{2}\sum_{p=2}^{2} h_{kp}(X) + \sum_{k=1}^{2}\sum_{p=1}^{4} z_{kp}(X)$$

$$f_2(X) = \sum_{k=1}^{2} arclen_k(X) + \sum_{k=1}^{1} seglen_k(X) + \sum_{k=1}^{2}\sum_{p=2}^{2} h_{kp}(X) + \sum_{k=1}^{2}\sum_{p=1}^{4} z_{kp}(X)$$

The device takes into account in the above equations:
for vessel $V_1$, the start circle $C_{1,1}$, the end circle $C_{1,2}$
for vessel $V_2$, the start circle $C_{2,1}$, the end circle $C_{2,2}$ The unknown vector which is sought:

$$X = \begin{pmatrix} xT_{1,1,b} \\ yT_{1,1,b} \\ xT_{2,1,b} \\ yT_{2,1,b} \\ xQ_{1,1} \\ yQ_{1,1} \\ xQ_{1,2} \\ yQ_{1,2} \\ xT_{1,2,b} \\ yT_{1,2,b} \\ xT_{2,2,b} \\ yT_{2,2,b} \\ xQ_{2,1} \\ y_{2,1} \\ xQ_{2,2} \\ yQ_{2,2} \\ v_1 \\ v_2 \end{pmatrix}$$

The constraints under which the minimization is subject to can be expressed as follow:
for example, the constraint relative to the tangency of straight segments can be expressed as follows:

$$\left\{ \begin{array}{l} \overrightarrow{Q_{1,1}T_{1,1,b}} \cdot \overrightarrow{T_{1,1,b}T_{1,2,a}} = 0 \\ \overrightarrow{Q_{1,1}T_{1,1,b}} \cdot \overrightarrow{T_{1,1,b}T_{1,2,a}} = 0 \end{array} \right\}$$

for example, the radius of curvature of the start and end circles and the curvilinear geometric form is greater than or equal to 2 km for the vessel $V_1$ and greater than or equal to 3 km for the vessel $V_2$;
for example, the speed for vessel $V_1$ is comprised between 3 and 5 knots, and between W and Z for vessel $V_2$.
the travel time is identical for the vessels $V_1$ and vessel $V_2$.

The global cost function F(X) is then minimized under the above constraints using the Newton's method to compute the unknown vector X, from which is determined the sail path of each vessel $V_1$ and vessel $V_2$.

In step 26, the device carries out a test to know if the minimisation algorithm converges on a consistent solution. For that end, the device controls that the sail paths determined in step 25 exists and do not enter in a circle encompassing an obstacle (this is an additional constraint is required to be satisfied after sail path computing).

If the minimisation algorithm converges on a consistent solution, then the device goes to step 28 where it provides, for each vessel of the fleet, an optimal sail path to perform the turn while ensuring no collision with the detected obstacles. The result of step 28 can be displayed on the map to the operator via a man/machinery interface. The algorithm is finished.

If the minimisation algorithm does not converge on a consistent solution, then the device goes to step 27 in which the variable q is automatically incremented by 1 (q=q+1) before going back to the step 25 where a new iteration of steps 25 and 26 is carried out with an additional obstacle.

In the present example (FIG. 4a), the sail paths determined by the device interfere with the circles in which are encompassed the obstacles $O_2$ and $O_3$. The device goes to step 27 in which the variable q is automatically incremented by 1 and goes back to step 25 to run again the minimisation algorithm.

For q=1 (one obstacle considered)

This is illustrated by FIG. 4b.

Based on the equation (2):

$$f_1(X) = \sum_{k=1}^{3} arclen_k(X) + \sum_{k=1}^{2} seglen_k(X) + \sum_{k=1}^{2}\sum_{p=2}^{2} h_{kp}(X) + \sum_{k=1}^{2}\sum_{p=1}^{4} z_{kp}(X)$$

$$f_2(X) = \sum_{k=1}^{3} arclen_k(X) + \sum_{k=1}^{2} seglen_k(X) +$$

$$\sum_{k=1}^{2}\sum_{p=2}^{2} h_{kp}(X) + \sum_{k=1}^{2}\sum_{p=1}^{4} z_{kp}(X)$$

The device takes into account in the above equations:
for vessel $V_1$, the start circle $C_{1,1}$, the end circle $C_{1,2}$,
for vessel $V_2$, the start circle $C_{2,1}$, the end circle $C_{2,2}$, and an intermediate circle into which is encompassed an obstacle.

Let's take, for example, the obstacle $O_1$ which is encompassed in the intermediate circle $C_{1,3}$. The unknown vector can be expressed as follow:

$$X = \begin{pmatrix} xT_{1,1,b} \\ yT_{1,1,b} \\ xT_{2,1,b} \\ yT_{2,1,b} \\ xQ_{1,1} \\ yQ_{1,1} \\ xQ_{1,2} \\ yQ_{1,2} \\ xT_{1,2,b} \\ yT_{1,2,b} \\ xT_{2,2,b} \\ yT_{2,2,b} \\ xQ_{2,1} \\ y_{2,1} \\ xQ_{2,2} \\ yQ_{2,2} \\ xQ_{1,3} \\ yQ_{1,3} \\ xT_{1,3,a} \\ yT_{1,3,a} \\ xT_{1,3,b} \\ yT_{1,3,b} \\ xT_{2,3,a} \\ yT_{2,3,a} \\ xT_{2,3,b} \\ yT_{2,3,b} \\ v_1 \\ v_2 \end{pmatrix}$$

The constraints under which the minimization is subject are the same as those described above. The global cost function $F(X)$ is then minimized under the above constraints using the Newton's method to compute the unknown vector X.

In step 26, the device carries out a new test of control of the sail paths determined in step 25, then goes to the step 27 or 28 as a function of the test results.

In the present example (FIG. 4b), the sail path determined for the vessel $V_2$ interferes with the circle in which is encompassed the obstacles $O_2$. As the minimisation algorithm does not converge on a consistent solution, the device goes to step 27 in which the variable q is automatically incremented by 1 and goes back to step 25 to run again the minimisation algorithm.

Thus, so long as no coherent solution is achieved, the device loops back to the step 25 to run the constrained minimization algorithm with a new set of obstacles.

For q=2 (two obstacles considered)

This is illustrated by FIG. 4c. The same reasoning is applied here with q=2.

In the present example (FIG. 4c), it appears that the minimisation algorithm does converge on a consistency solution, the sail path determined for each vessel $V_1$ and $V_2$ does not pass through any circle in which an obstacle is encompassed. This result is displayed on the map to the operator via a man/machinery interface. The determining algorithm of FIG. 2 is finished.

According to a particular feature especially beneficial in a multi-vessel context, the device in step 23 can minimize the cost function $f_i(X)$ further taking into consideration an additional term representative of speeds of the two vessels, noted s(X). The cost function $f_i(X)$ is then defined as.

$$f_i(X) = \sum_{k=1}^{min(N_i,q)+2} arclen_k(X) + \sum_{k=1}^{min(N_i-1,q-1)+2} seglen_k(X) +$$

$$\sum_{k=1}^{M}\sum_{p=k+1}^{M} h_{kp}(X) + \sum_{k=1}^{M}\sum_{p=1}^{L} z_{kp}(X) + s(X)$$

For example, $s(X) = \sum_{i=1}^{M} v_i^p$, $p \in \mathbb{N}$, with M the number of vessels involved in the multi-vessel survey operation and $v_i$ the speed of the vessel i. This additional term s(X) aims at causing the resulting speeds of vessels to be the slowest possible. Indeed, the minimization of the global cost function F(X) is carried out by minimizing all the terms of that function. The term s(X) increases quickly because of the power applied. The constraint optimization algorithm therefore minimizes this term to lower limits.

The number of obstacles (and therefore the number of curvilinear geometric forms) taken into account is deliberately limited for the purpose of the pedagogical description, and so as not to burden the description and figures. Of course, one may envisage another embodiments according to which a greater number of obstacles can be involved in the sail path computation. To limit computing time, it is also possible to set a maximal number of obstacles to take into consideration in the sail path computation.

It should be noted that this minimization method is a particular example of embodiment among others possible embodiments. Any minimization method of cost function comprising at least a term representative of the length of arc segments making up the sail path to be determined and a term representative of the length of straight segments making up the sail path to be determined, can be envisaged without departing from the scope of the invention.

FIGS. 3 and 4 illustrates the determining method for a multi-vessel seismic operation. Of course the present invention applies for a seismic operation implying a single vessel. In that case, the global cost function F(X) to be minimized under constraints is simplified; it can be expressed as follows:

$$F(X) = \frac{f_i(X)}{v_i} = \frac{1}{v_i}\left[\sum_{k=1}^{min(N_i,q)+2} arclen_k(X) + \sum_{k=1}^{min(N_i-1,q-1)+2} seglen_k(X) \sum_{k=1}^{M}\sum_{p=1}^{L} z_{kp}(X)\right]$$

Figure 5:
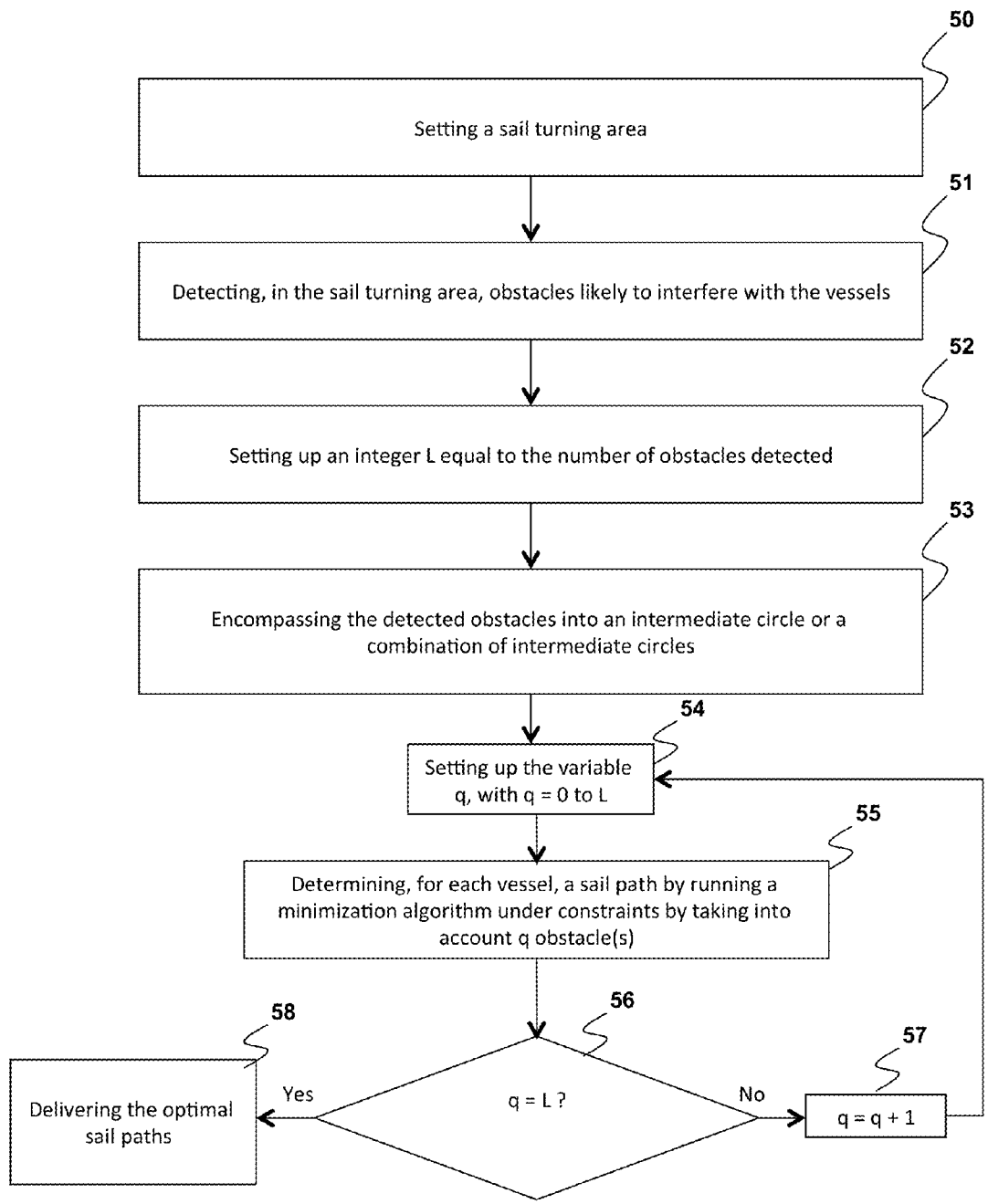
FIG. 5 illustrates an alternative embodiment of the method according to the invention.

FIG. 5 illustrates an alternative embodiment of the method according to the invention. Steps 50 to 55 and step 57 are identical to the steps 20 to 25 and step 27 respectively. In step 55, the device runs the minimization algorithm under the set of constraints discussed above in order to determine, for each vessel of the fleet, a optimal sail path to perform a turn, taking into account q obstacle(s). At the end of this step, the device obtains a solution (which can be consistent or not).

In step 56, contrary to step 26 where the device checks that the minimisation algorithm converges on a consistent solution, the device carries out a test to know if the variable q, which corresponds to the number of obstacles taken into account the sail path computation, is equal to L (which is the total number of obstacles detected in step 51).

If not (q≠L), the device goes to step 57 in which variable q is automatically incremented by 1 and goes back to step 55 to run again the minimisation algorithm and obtain a new solution. Thus, so long as all the values of variable q are not tested, the device loops back to step 55 to run the constrained minimization algorithm with a new set of obstacles.

Thus, in this alternative embodiment, the devices carries out at least two iterations of steps 57 and 55 (selection of a number q of obstacle(s) and determination of a sail path with the number q obstacle(s)) with different numbers q of obstacles so as to deliver a set of potential path sails. Of course, for a given iteration, if the step 55 delivers no coherent solution, the device provides no potential path sail.

If so (q=L), the device goes to step 58 in which it chooses, for each vessel, among the potential sail paths obtained for said vessel, the best sail path according to a predetermined operational criteria. For example, the operational criteria is the vessel sailing time (temporal criteria). In that case, the best sail path is the sail path, among the potential sail paths, that has the shortest sail time. The best sail path for each vessel is then displayed on the map to the operator via a man/machinery interface. The determining algorithm of FIG. 5 is finished.

Of course, other operational criterion could be used without disparting from the scope of the invention, like the length of the chosen path for example (distance criteria). In that case, the best sail path is the sail path among the potential paths that has the shortest length.

Of course, if the devices only determine only potential path sail following the L+1 iterations, it chooses this path sail as the best sail path determined.

Figure 1:
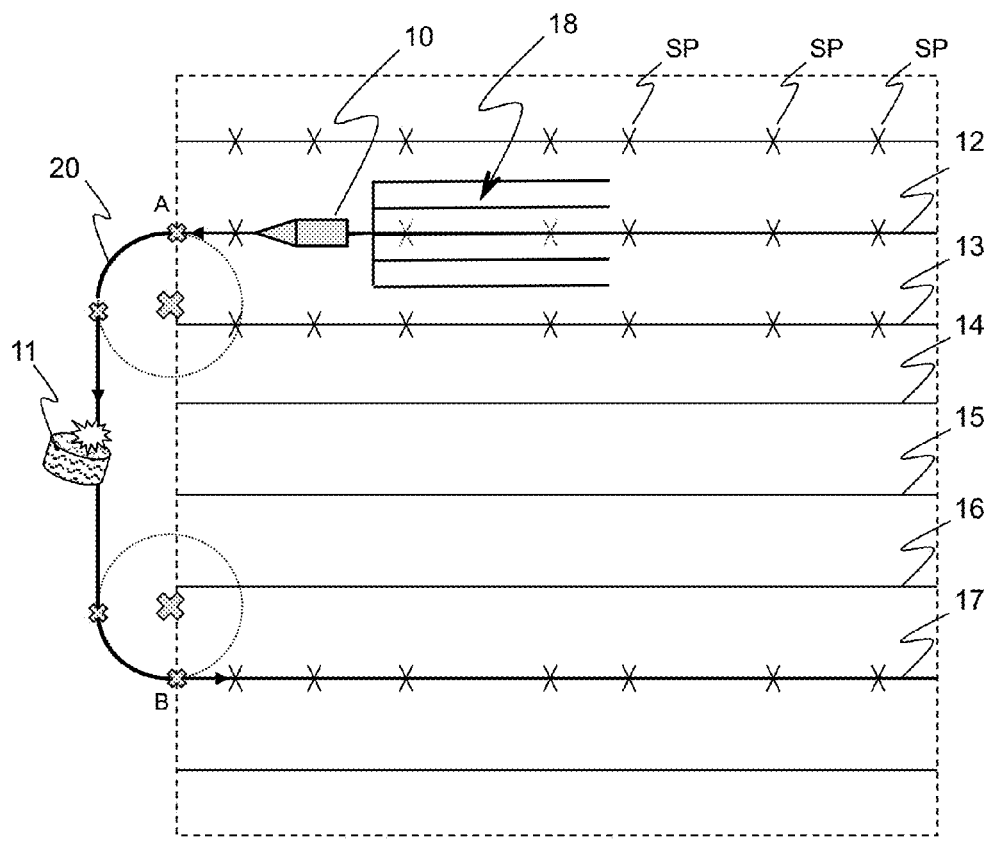
Figure 6:
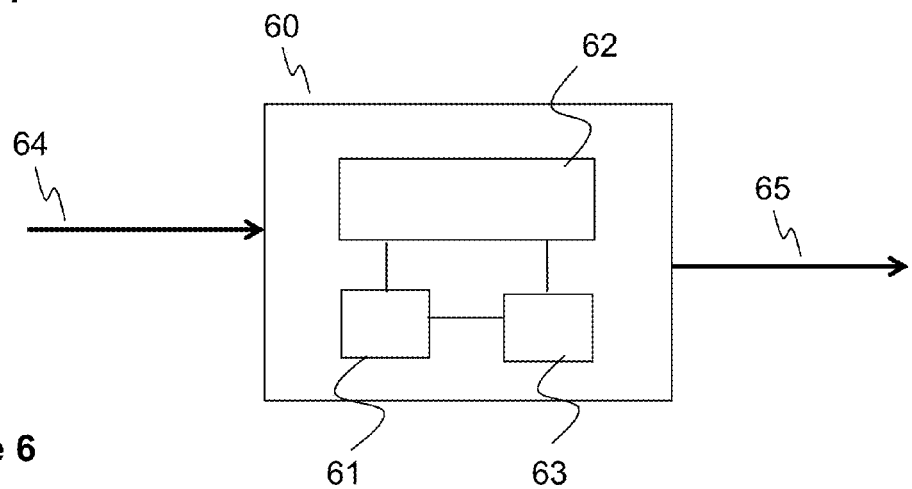
FIG. 6 shows an example of simplified structure of a determining device according to a particular embodiment of the invention.

FIG. 6 shows the simplified structure of a determining device (or a machine) 60 according to a particular embodiment of the invention, which carries out the steps of the method discussed above in relation with FIG. 2 or FIG. 5.

This device can be implemented for example by the integrated navigation system (INS) which is onboard a master vessel (e.g. the vessel V1).

The device 60 comprises a non-volatile memory 61 (e.g. a read-only memory (ROM) or a hard disk), a volatile memory 63 (e.g. a random access memory or RAM) and a processor 62. The non-volatile memory 61 is a non-transitory computer-readable carrier medium. It stores executable program code instructions, which are executed by the processor 62 in order to enable implementation of the method described above (method for determining a sail path of at least one vessel on a map representative of a marine geographic area, to perform a turn).

Upon initialization, the aforementioned program code instructions are transferred from the non-volatile memory 61 to the volatile memory 63 so as to be executed by the processor 62. The volatile memory 63 likewise includes registers for storing the variables and parameters required for this execution.

The device 60 receives as input 64 a map representative of a real marine geographic area. The map comprises obstacles whose localization is previously known. The operator can update this map in case of new obstacles would be detected during a survey operation. The device 60 generates as output a collision free sail path for at least one given vessel.

All the steps of the above path determining method can be implemented equally well:
- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

An exemplary embodiment of the present application provides a method and a device for determining an anti-collision sail path of at least one vessel to perform a turn, this method being executed automatically without requiring any human operator.

An exemplary embodiment provides a method and a device of this kind that allows avoiding collisions with obstacles present in the marine survey area.

An exemplary embodiment provides a method and a device of this kind involving a plurality of vessels and avoiding collisions between the vessels of this fleet.

An exemplary embodiment provides a method and a device of this kind that ensures, in the presence of obstacles and/or a plurality of vessels, perfect time synchronization between vessels at the end of their turn.

An exemplary embodiment provides a method and a device of this kind that ensures a cost-efficiency marine survey.

An exemplary embodiment provides a method and a device of this kind that is simple and cost-efficiency to implement.

It should be noted that the invention is not limited to a purely software-based implementation, in the form of computer program instructions, but that it can also be implemented in hardware form or any form combining a hardware portion and a software portion. It is sought more particularly here above in this document to describe the invention in the context of sea oil survey. The invention of course is not limited to this particular field of application but is of interest for any method and device for determining a sail path of vessel that has to cope with closely related or similar issues. Although the present disclosure has been described with reference to one or more examples, persons skilled in the art will recognize that changes may be made in form and detail without departing from the scope of the disclosure and/or the appended claims.

The invention claimed is:

1. A method comprising:
determining with a computing device, a sail path of at least one vessel on a map representative of a marine geographic area, to perform a turn between a start point and an end point, said at least one vessel having a turn radius,
wherein said turn radius defines the minimum radius of curvature that said at least one vessel is able to make when turning, the start point being associated with a start curvilinear geometric form, and the end point being associated with an end curvilinear geometric form,
said start and end curvilinear geometric forms each comprising a circle or an ellipse or a combination of at least part of a circle and part of an ellipse each having a predefined radius of curvature larger than or equal to said turn radius, the sail path being curvilinear and composed of arc segments and straight segments and comprising at least one segment of arc of the start curvilinear geometric form and at least one segment of arc of the end curvilinear geometric form,
wherein determining the sail path comprises acts of:
detecting, in the map, at least one obstacle likely to interfere with said at least one vessel;
and for said at least one vessel:
encompassing said at least one detected obstacle into an intermediate curvilinear geometric form comprising a circle or ellipse or of a combination of parts of circle(s) and/or ellipse(s) each having a radius of curvature, at every point of the circumference of said intermediate curvilinear geometric form, that is greater than or equal to said radius of curvature of said at least one vessel, and
determining a sail path of said given vessel by minimizing, under a set of predefined constraints, an individual cost function comprising:
a first term representative of the length of arc segments making up the sail path to be determined, said first term being a function of the start and end curvilinear geometric forms, and of the intermediate curvilinear geometric form into which is encompassed said at least one detected obstacle,
a second term representative of the length of straight segments making up the sail path to be determined, said second term being a function of the start and end curvilinear geometric forms, and of the intermediate curvilinear geometric form into which is encompassed said at least one detected obstacle, and
a third term of penalization of the individual cost function, said third term being a function of a distance separating the sail path to be determined, and at least one disturbing object, said penalization increasing when said distance decreases; providing the sail path in a navigation system; and
driving the at least one vessel along the sail path using the navigation system.

2. A method comprising:
determining with a computer a sail path of a fleet comprising at least two vessels on a map representative of a marine geographic area, to perform a turn between a start point and an end point, each vessel having a turn radius,
wherein said turn radius defines the minimum radius of curvature that said each vessel is able to make when turning, the start point being associated with a start curvilinear geometric form, and the end point being associated with an end curvilinear geometric form,
said start and end curvilinear geometric forms each comprising a circle or an ellipse or a combination of at least part of a circle and part of an ellipse each having a predefined radius of curvature larger than or equal to said turn radius, the sail path being curvilinear and composed of arc segments and straight segments and comprising at least one segment of arc of the start curvilinear geometric form and at least one segment of arc of the end curvilinear geometric form, wherein determining the sail path comprises acts of:
detecting, in the map, at least one obstacle likely to interfere with said fleet of vessels;
and for said fleet of vessels:
encompassing, for each vessel, said at least one detected obstacle into a curvilinear geometric form comprising an intermediate circle or ellipse or of a combination of intermediate parts of circle(s) and/or ellipse(s) each having a radius of curvature, at every point of the circumference of said intermediate curvilinear geometric form, that is greater than or equal to said turn radius of each vessel,
determining the sail paths of the fleet vessels by minimizing, under a set of predefined constraints, a sum of individual cost functions, each individual cost function being associated with a distinct vessel of the fleet, and comprising:
a first term representative of the length of arc segments making up the sail path to be determined, said first term being a function of the start and end curvilinear geometric forms, and of the intermediate curvilinear geometric form into which is encompassed said at least one detected obstacle,
a second term representative of the length of straight segments making up the sail path to be determined, said second term being a function of the start and end curvilinear geometric forms, and of the intermediate curvilinear geometric form into which is encompassed said at least one detected obstacle, and
a third term of penalization of the individual cost function, said third term being a function of a distance separating the sail path to be determined, and at least one disturbing object, said penalization increasing when said distance decreases; providing the sail path in a navigation system; and
driving the fleet along the sail path using the navigation system.

3. The method according to claim 2, wherein each individual cost function further comprises a fourth term representative of speeds of said at least two vessels.

4. The method according to claim 1, wherein said at least one disturbing object is an obstacle detected in said detecting act, said detected obstacle being either fixed or moving.

5. The method according to claim 1, wherein, said at least one vessel being part of a fleet of vessels, said at least one disturbing object is a vessel of said fleet.

6. The method according to claim 1, wherein said set of predefined constraints belongs to the group consisting of:
as geometrical constraints:
a constraint relative to the tangency of straight segments making up the sail path to be determined;
a constraint relative to the azimuth at the start and end points;
a constraint relative to the positioning of tangential points on the start and end curvilinear geometric forms and the intermediate curvilinear geometric form;
a constraint relative to the radius of curvature of the start and end curvilinear geometric forms and the intermediate curvilinear geometric form;
as operational constraints:
a constraint relative to said at least one vessel speed;
a constraint relative to said at least one vessel synchronization.

7. The method according to claim 1, wherein each of the start and end curvilinear geometric forms and the intermediate curvilinear geometric forms consists each of a circle.

8. The method according to claim 1, comprising the following acts:
selecting a given number of obstacle(s) each associated with an intermediate curvilinear geometrical form;
carrying out said determining act taking into account said given number of obstacle(s);
checking that said determined sail path does not pass through a curvilinear geometric form;
and wherein, in the event, said determined sail path passes through a curvilinear geometric from, carrying out a new iteration of said acts with a different given numbers of obstacle(s).

9. The method according to claim 1, comprising the following acts:
selecting a number q of obstacle(s) each associated with an intermediate curvilinear geometrical form;
carrying out said determining act with said number q of obstacle(s);
wherein at least two iterations of said acts are carried out with different numbers q of obstacle(s) so as to deliver a set of at least two respective potential sail paths,
and wherein said method comprises an act of selecting, among said set of potential sail paths, a sail path as a function of a predetermined operational criteria.

10. The method according to claim 1, wherein the first and second terms take into account a number of intermediate curvilinear geometrical forms lower than or equal to a predetermined maximum number.

11. The method according to claim 1, comprising an act of setting, in said map, a sail turning area of at least one vessel, having a predetermined geometric form and in which are located said start and end points, and wherein said detecting act is carried out as a function of the sail turning area.

12. The method according to claim 11, wherein the predetermined geometric form of the sail turning area has a center at the barycenter of the start and end points of said at least one vessel.

13. The method according to claim 11, wherein the predetermined geometric form of the sail turning area is an ellipse.

14. A non-transitory computer-readable medium storing a computer program product comprising program code instructions for implementing a method, when said instructions are executed on a computer or a processor of at least one vessel, the method comprising:
determining by the computer or processor the sail path of at least one vessel on a map representative of a marine geographic area, to perform a turn between a start point and an end point, said at least one vessel having a turn radius,
wherein said turn radius defines the minimum radius of curvature that said at least one vessel is able to make when turning, the start point being associated with a start curvilinear geometric form, and the end point being associated with an end curvilinear geometric form,
said start and end curvilinear geometric forms each comprising a circle or an ellipse or a combination of at least part of a circle and part of an ellipse each having a predefined radius of curvature larger than or equal to said turn radius, the sail path being curvilinear and composed of arc segments and straight segments and comprising at least one segment of arc of the start curvilinear geometric form and at least one segment of arc of the end curvilinear geometric form,
wherein determining the sail path comprises acts of:
receiving the map by the computer or processor;
detecting, in the map, at least one obstacle likely to interfere with said at least one vessel; and for said at least one vessel:
encompassing said at least one detected obstacle into an intermediate curvilinear geometric form comprising a circle or ellipse or of a combination of parts of circle(s) and/or ellipse(s) each having a radius of curvature, at every point of the circumference of said intermediate curvilinear geometric form, that is greater than or equal to said radius of curvature of said at least one vessel, and
determining a sail path of said at least one vessel by minimizing, under a set of predefined constraints, an individual cost function comprising:
a first term representative of the length of arc segments making up the sail path to be determined, said first term being a function of the start and end curvilinear geometric forms, and of the intermediate curvilinear geometric form into which is encompassed said at least one detected obstacle,
a second term representative of the length of straight segments making up the sail path to be determined, said second term being a function of the start and end curvilinear geometric forms, and of the intermediate curvilinear geometric form into which is encompassed said at least one detected obstacle, and
a third term of penalization of the individual cost function, said third term being a function of a distance separating the sail path to be determined, and at least one disturbing object, said penalization increasing when said distance decreases;
providing the sail path in a navigation system to enable said navigation system to drive the at least one vessel along the sail path.

15. A device for determining a sail path of at least one vessel on a map representative of a marine geographic area, to perform a turn between a start point and an end point, said at least one vessel having a turn radius,
wherein said turn radius defines the minimum radius of curvature that said at least one vessel is able to make when turning, the start point being associated with a start curvilinear geometric form, and the end point being associated with an end curvilinear geometric form, said start and end curvilinear geometric forms each comprising a circle or an ellipse or a combination of at least part of a circle and part of an ellipse each having a predefined radius of curvature larger than or equal to said turn radius, the sail path being curvilinear and composed of arc segments and straight segments and comprising at least one segment of arc of the start curvilinear geometric form and at least one segment of arc of the end curvilinear geometric form, wherein the device comprises:

means for detecting, in the map, at least one obstacle likely to interfere with said at least one vessel;

and for said at least one vessel:

means for encompassing said at least one detected obstacle into an intermediate curvilinear geometric form comprising a circle or ellipse or of a combination of parts of circle(s) and/or ellipse(s) each having a radius of curvature, at every point of the circumference of said intermediate curvilinear geometric form, that is greater or equal to said turn radius of said at least one vessel, means for determining a sail path of said at least one vessel by minimizing, under a set of predefined constraints, an individual cost function comprising:

a first term representative of the length of arc segments making up the sail path to be determined, said first term being a function of the start and end curvilinear geometric forms, and of the intermediate curvilinear geometric form into which is encompassed said at least one detected obstacle, a second term representative of the length of straight segments making up the sail path to be determined, said second term being a function of the start and end curvilinear geometric forms, and of the intermediate curvilinear geometric form into which is encompassed said at least one detected obstacle, and a third term of penalization of the individual cost function, said third term being a function of a distance separating the sail path to be determined, and at least one disturbing object, said penalization increasing when said distance decreases;

means for providing the sail path in a navigation system to enable said navigation system to drive the at least one vessel along the sail path.

16. A device for determining a sail path of a fleet comprising at least two vessels on a map representative of a marine geographic area, to perform a turn between a start point and an end point, each vessel having a turn radius, wherein said turn radius defines the minimum radius of curvature that said each vessel is able to make when turning, the start point being associated with a start curvilinear geometric form, and the end point being associated with an end curvilinear geometric form, said start and end curvilinear geometric forms each comprising a circle or an ellipse or a combination of at least part of a circle and part of an ellipse each having a predefined radius of curvature larger than or equal to said turn radius, the sail path being curvilinear and composed of arc segments and straight segments and comprising at least one segment of arc of the start curvilinear geometric form and at least one segment of arc of the end curvilinear geometric form, wherein the device comprises:

means for detecting, in the map, at least one obstacle likely to interfere with said fleet of vessels and for said fleet of vessels:

means for encompassing, for each vessel, said at least one detected obstacle into a curvilinear geometric form consisting of an intermediate circle or ellipse or of a combination of parts of intermediate circle(s) and/or ellipse(s) each having a radius of curvature, at every point of the circumference of said intermediate curvilinear geometric form, that is greater or equal to said turn radius of each vessel, means for determining the sail paths of the fleet vessels by minimizing, under a set of predefined constraints, a sum of individual cost functions, each individual cost function being associated with a distinct vessel of the fleet, and comprising:

a first term representative of the length of arc segments making up the sail path to be determined, said first term being a function of the start and end curvilinear geometric forms, and of the intermediate curvilinear geometric form into which is encompassed said at least one detected obstacle, a second term representative of the length of straight segments making up the sail path to be determined, said second term being a function of the start and end curvilinear geometric forms, and of the intermediate curvilinear geometric form into which is encompassed said at least one detected obstacle, and a third term of penalization of the individual cost function, said third term being a function of a distance separating the sail path to be determined, and at least one disturbing object, said penalization increasing when said distance decreases;

means for providing the sail path in a navigation system to enable said navigation system to drive the fleet vessels along the sail path.

* * * * *